(12) United States Patent
Boutcher et al.

(10) Patent No.: US 7,412,545 B2
(45) Date of Patent: Aug. 12, 2008

(54) APPARATUS AND METHOD FOR UPDATING I/O CAPABILITY OF A LOGICALLY-PARTITIONED COMPUTER SYSTEM

(75) Inventors: David Charles Boutcher, Rochester, MN (US); Charles Scott Graham, Rochester, MN (US); Harvey Gene Kiel, Rochester, MN (US); Chetan Mehta, Austin, TX (US); Jaya Srikrishnan, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 10/897,332

(22) Filed: Jul. 22, 2004

(65) Prior Publication Data

US 2006/0020943 A1 Jan. 26, 2006

(51) Int. Cl.
G06F 3/00 (2006.01)
G06F 13/12 (2006.01)
G06F 9/00 (2006.01)

(52) U.S. Cl. .............................. 710/36; 710/62; 713/1; 713/2; 713/100

(58) Field of Classification Search ........................ None
See application file for complete search history.

(56) References Cited

U.S. PATENT DOCUMENTS

| | | | |
|---|---|---|---|
| 6,513,115 B2 * | 1/2003 | Nock et al. | 713/100 |
| 6,684,396 B1 * | 1/2004 | Brittain et al. | 717/168 |
| 6,912,668 B1 * | 6/2005 | Brown et al. | 714/6 |
| 2004/0221193 A1 * | 11/2004 | Armstrong et al. | 714/10 |
| 2005/0010913 A1 * | 1/2005 | Chen | 717/168 |
| 2006/0069753 A1 * | 3/2006 | Hu et al. | 709/220 |

* cited by examiner

*Primary Examiner*—Alan Chen
(74) *Attorney, Agent, or Firm*—Martin & Associates

(57) ABSTRACT

A hosting partition update mechanism allows updating the I/O capability of a logically-partitioned computer system in a way that minimally affects the performance and availability of I/O in the computer system. When an update is needed, a new hosting partition is created with the desired update(s). The I/O adapters in the current hosting partition are then migrated to the new hosting partition. The migration of an I/O adapter from the current hosting partition to the new hosting partition is relatively fast, thereby minimally impacting system performance and availability of I/O. Once all of the I/O adapters have been migrated to the new hosting partition, the current hosting partition may be kept as a backup, or may be eliminated. Providing a new or backup hosting partition allows updates to be performed in the new or backup hosting partition in a non-disruptive manner while the current hosting partition continues to service I/O requests.

13 Claims, 8 Drawing Sheets

APPARATUS AND METHOD FOR UPDATING I/O CAPABILITY OF A LOGICALLY-PARTITIONED COMPUTER SYSTEM

BACKGROUND OF THE INVENTION

1. Technical Field

This invention generally relates to data processing, and more specifically relates to the sharing of resources between logical partitions in a logically partitioned computer system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources into different computing environments. The IBM Power5 computer systems developed by IBM are examples of computer systems that support logical partitioning. If logical partitioning on a IBM Power5 computer system is desired, partition manager code (referred to as a "hypervisor" in IBM Power5 terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources between the logical partitions. For example, a computer system with a single CPU could have two logical partitions defined, with 50% of the CPU allocated to each logical partition, with 33% of the memory allocated to the first logical partition and 67% of the memory allocated to the second logical partition, and with two different I/O slots allocated to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

In addition to having their own allocated resources, logical partitions may also share some resources that have been allocated to a different logical partition. When logical partitions share a resource, such as an I/O adapter, one of the logical partitions is typically designated as the "owner" of the resource, and other logical partitions may share the resource by communicating with the logical partition that owns the resource. For the discussion herein, the term "hosting partition" refers to a logical partition that owns (i.e., controls) a resource, and the term "hosted partition" refers to a logical partition that does not own the resource but that desires to use (or share) the resource by communicating with the hosting partition.

Software running on a hosting partition (such as the operating system software or a device driver) may periodically need to be updated, to fix a problem in the code or to add one or more new functions. Such an update may require a reboot of the hosting partition. In the prior art, this means that the hosting partition will stop receiving I/O requests for its shared I/O adapters, and the I/O will be unavailable until the reboot and re-initialization of the hosting partition is complete. In many computer systems that have multiple partitions, the time to reboot a hosting partition creates a delay in I/O performance that is excessive and undesirable. Such a delay appear as an I/O failure that may cause applications to fail due to unavailable I/O. Without a way to update a hosting partition in a way that does not cause undue performance penalties and application failures due to unavailable I/O, the computer industry will continue to suffer from unacceptable consequences that result from updating a hosting partition in a logically-partitioned computer system.

DISCLOSURE OF INVENTION

A hosting partition update mechanism allows updating the I/O capability of a logically-partitioned computer system in a way that minimally affects the performance and availability of I/O in the computer system. When an update is needed, a new hosting partition is created with the desired update(s). The I/O adapters in the current hosting partition are then migrated to the new hosting partition. The migration of an I/O adapter from the current hosting partition to the new hosting partition is relatively fast, thereby minimally impacting system performance and availability of I/O. Once all of the I/O adapters have been migrated to the new hosting partition, the current hosting partition may be kept as a backup, or may be eliminated. Providing a new or backup hosting partition allows updates to be performed in the new or backup hosting partition in a non-disruptive manner while the current hosting partition continues to service I/O requests.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 2:
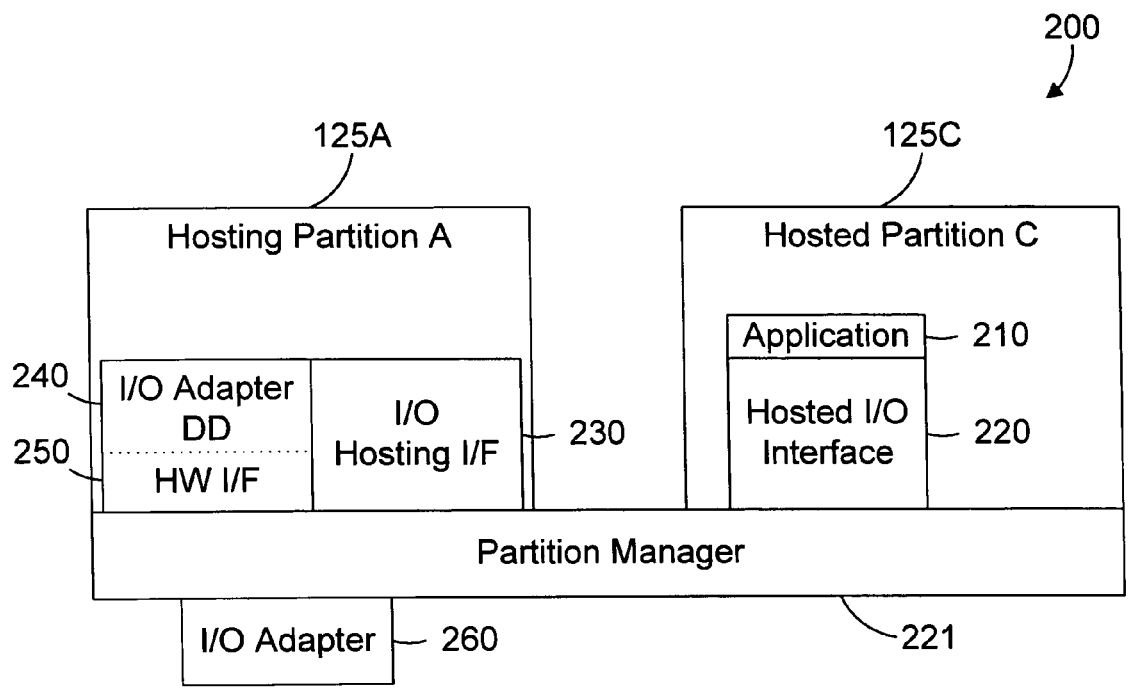
FIG. 2 is a block diagram of a prior art logically-partitioned computer system.

A prior art system is first examined to provide a context for discussing the advantages of the preferred embodiments. Referring to FIG. 2, a prior art computer system 200 includes a hosting partition 125A and a hosted partition 125C that are managed by a partition manager 221. Hosting partition 125A controls the function of an I/O adapter 260 via the partition manager 221. The hosting partition 125A includes a hardware interface 250, a device driver 240, and an I/O hosting interface 230. The hosted partition 125C includes one or more software applications 210 that may share the I/O adapter 260 by using the hosted I/O interface 220. The hosted I/O interface 220 communicates with the hosting I/O interface 230 to route I/O operations to the shared I/O adapter 260 that is controlled by the hosting partition 125A.

Figure 3:
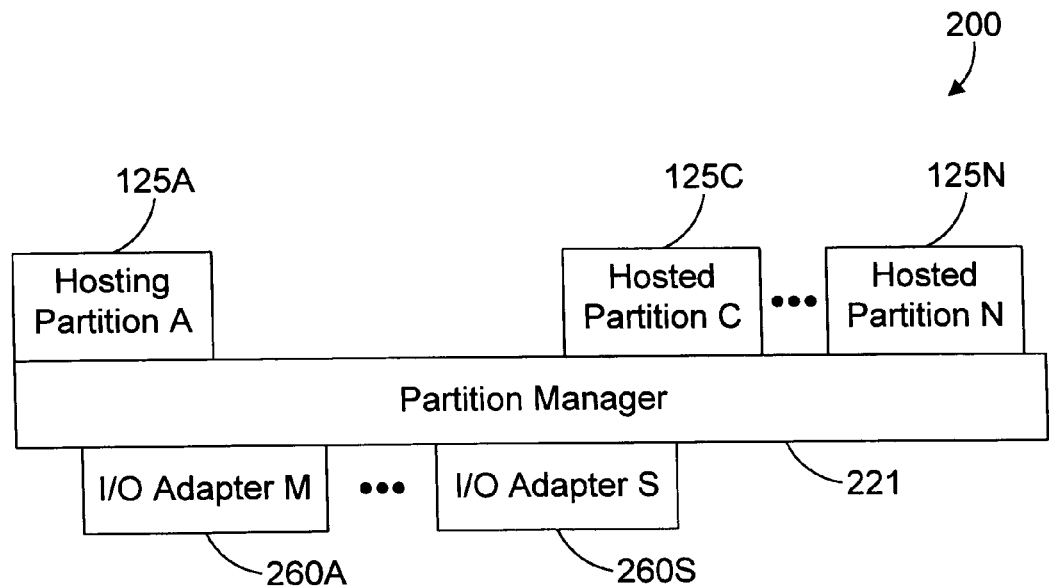
FIG. 3 is a block diagram of the prior art logically-partitioned computer system in FIG. 2 showing multiple hosted partitions.

A higher level logical view of prior art computer system 200 is shown in FIG. 3. This view shows multiple I/O adapters 260A, ..., 260S that may be controlled by different hosting partitions, but that are preferably all controlled by a single hosting partition 125A. Also shown in FIG. 3 is a plurality of hosted partitions 125C, ..., 125N that share the I/O adapters 260A, ..., 260S.

Figure 4:
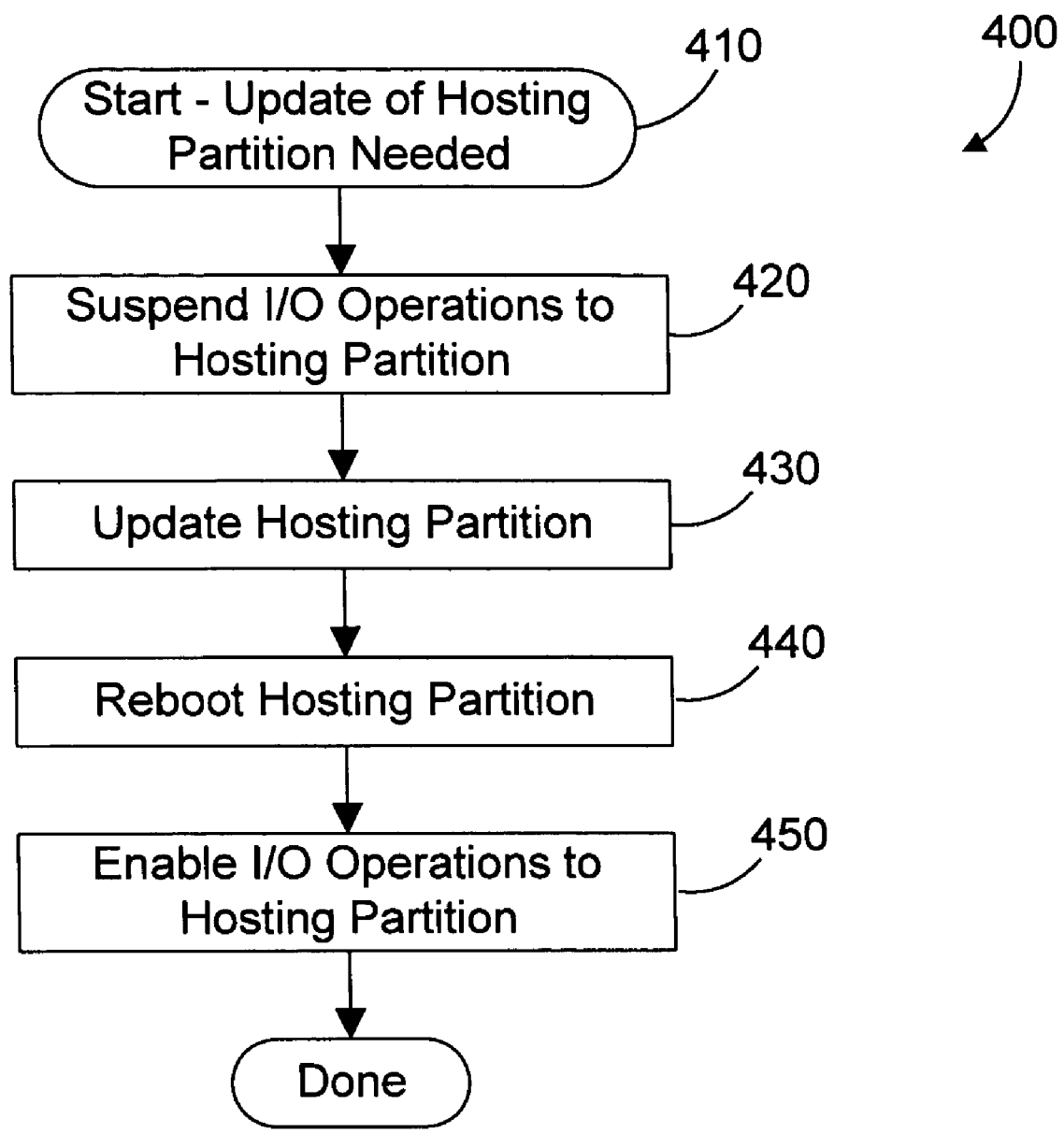
FIG. 4 is a flow diagram of a prior art method for updating a hosting partition.

Referring now to FIG. 4, a prior art method 400 begins when an update of a hosting partition is needed (step 410). All I/O operations to the hosting partition are suspended (step 420). The hosting partition is then updated (step 430). We assume for this example that the update requires a reboot of the hosting partition (step 440). Once rebooted, I/O operations to the hosting partition are enabled (step 450). Note that steps 420-450 may take a considerable amount of time, causing logical hosted partitions that need to use the I/O in the hosting partition to fail or to wait an unreasonably long period of time for the I/O to occur. With modern computer systems that may include many logical partitions that all share I/O adapters in a single I/O partition, the updating of the I/O partition using prior art method 400 causes a substantial degradation in system performance and may cause application failures due to the I/O being unavailable for an excessive period of time.

According to preferred embodiments of the present invention, a hosting partition update mechanism allows updating a hosting partition with minimal impact on system performance. A new hosting partition is created and updated with the desired update(s). The I/O adapters in the current hosting partition are then migrated to the new hosting partition. Once the migration of I/O adapters is complete, the current hosting partition may be kept as a backup or may be eliminated. The preferred embodiments includes the ability for the system administrator to perform an automatic update now, to specify that automatic updates may be performed in the future when required, to direct an update according to selected parameters, and to schedule an update at a set time in the future.

Figure 1:
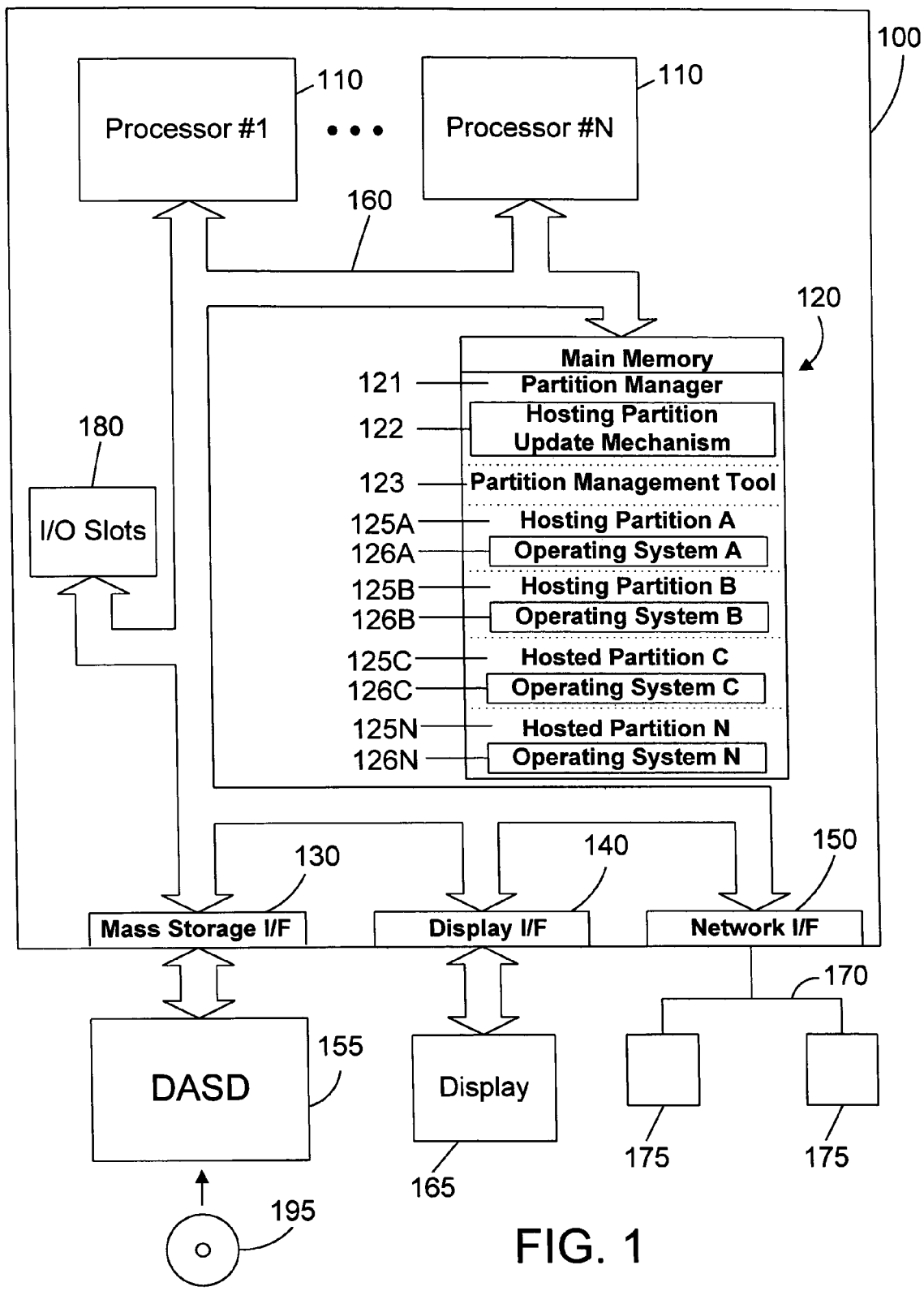
FIG. 1 is a block diagram of a computer apparatus that supports logical partitioning, I/O adapter sharing and the updating of I/O capability in accordance with the preferred embodiments.

Referring to FIG. 1, a computer system 100 is an enhanced IBM eServer iSeries computer system, and represents one suitable type of computer system that supports logical partitioning, I/O adapter sharing and updating of I/O capability in accordance with the preferred embodiments. Those skilled in the art will appreciate that the mechanisms and apparatus of the present invention apply equally to any computer system that supports logical partitions. As shown in FIG. 1, computer system 100 comprises one or more processors 110 connected to a main memory 120, a mass storage interface 130, a display interface 140, a network interface 150, and a plurality of I/O slots 180. Note that one or more of mass storage interface 130, display interface 140, and network interface 150 could be embedded I/O on computer system 100. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195. Note that mass storage interface 130, display interface 140, and network interface 150 may actually be implemented in adapters coupled to I/O slots 180. An I/O adapter is one suitable network interface 150 that may be implemented in an external card that is plugged into one of the I/O slots 180.

Main memory 120 contains a partition manager 121, a partition management tool 123, and N logical partitions 125, shown in FIG. 1 as logical partitions 125A through 125N. Partition manager 121 preferably creates these N logical partitions 125. Each logical partition 125 preferably includes a corresponding operating system 126, shown in FIG. 1 as operating systems 126A through 126N.

Partition manager 121 includes a hosting partition update mechanism 122 that manages the updating of a hosting partition. While the hosting partition update mechanism 122 is shown in FIG. 1 to reside in main memory 120, one skilled in the art will appreciate that hosting partition update mechanism may include different pieces that reside within the logical partitions 125 and within the partition manager 121, and that sharing of an I/O adapter and updating of the I/O capability in accordance with the preferred embodiments occurs through cooperation of these different pieces.

Partition management tool 123 is a software tool that may be used by a user (e.g., system administrator) to configure and manage logical partitions on computer system 100. Partition management tool 123 includes a user interface that allows the user to enter information that determines the function of the partition manager 121. In the preferred embodiments, the partition management tool 123 may be used to interact with the user and to interact with the hosting partition update mechanism 122 in a way that allows the user to input information via the partition management tool 123 that determines how the hosting partition update mechanism 122 performs the update of the hosting partition.

Operating system 126 is a multitasking operating system, such as OS/400, AIX, or Linux; however, those skilled in the art will appreciate that the spirit and scope of the present invention is not limited to any one operating system. Any suitable operating system or control program can be used. Operating system 126 is a sophisticated program that contains low-level code to manage the resources of computer system 100. Some of these resources are processor 110, main memory 120, mass storage interface 130, display interface 140, network interface 150, system bus 160, and I/O slots 180. The operating system 126 in each partition may be the same as the operating system in other partitions, or may be a completely different operating system. Thus, one partition can run the OS/400 operating system, while a different partition can run another instance of OS/400, possibly a different release, or with different environment settings (e.g., time zone or language). The operating systems in the logical partitions could even be different than OS/400, provided it is compatible with the hardware (such as AIX or Linux). In this manner the logical partitions can provide completely different computing environments on the same physical computer system.

The partitions in FIG. 1 include for the purpose of illustration two hosting partitions 125A and 125B, and two hosted partitions 125C and 125N. The designation "hosting partition" applies to a logical partition that owns an I/O adapter that may be shared with one or more hosted partitions. The designation "hosted partition" applies to a logical partition that shares an I/O adapter owned (or controlled) by a hosting partition. Note that the terms "hosting" and "hosted" relate to individual resources (such as I/O adapters). Thus, let's assume that partition 125A owns a first I/O adapter and partition 125B owns a second I/O adapter, and that each partition shares its I/O adapter with the other partition. In this simple example, partition 125A would be a hosting partition for the first I/O adapter, and would be a hosted partition for the second I/O adapter. In similar fashion, partition 125B would be a hosting partition for the second I/O adapter, and would be a hosted partition for the first I/O adapter. The terms "hosting" and "hosted" thus designate a partition with respect to a particular resource, and do not generally apply in some global way to the entire partition. Note, however, that a special I/O partition could be defined that owns all of the I/O adapters in a computer system. In this configuration, the I/O partition would be the hosting partition, and all other partitions that share the I/O adapters would be hosted partitions. In the preferred embodiments, specially-configured I/O partitions are not allowed to run customer applications to improve the reliability of the I/O partitions.

The partitions 125A-125N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources, such as I/O slots 180 (and I/O adapters, which may reside in I/O slots 180). Thus, one partition could be defined to include two processors and a portion of memory 120, along with one or more embedded I/O that can provide the functions of mass storage interface 130, display interface 140, network interface 150, or interfaces to I/O adapters or other devices plugged into I/O slots 180. Another partition could then be defined to include three other processors, a different portion of memory 120, one or more embedded I/O, and different I/O slots 180. The partitions are shown in FIG. 1 to symbolically represent logical partitions, which would include system resources outside of memory 120 within computer system 100. Note also that the partition manager 121 preferably resides in memory and hardware separate from the logical partitions and includes facilities and mechanisms that are not directly available to the logical partitions.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while partition manager 121, partition management tool 123, and the partitions 125A-125N are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the partition manager 121, which initializes the operating systems in the logical partitions.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 5:
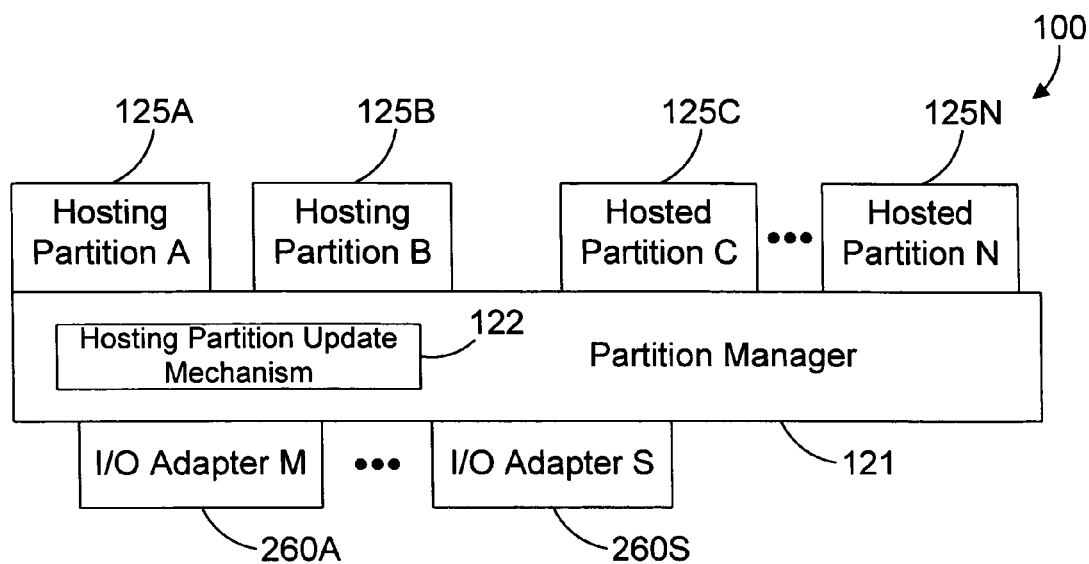
FIG. 5 is a block diagram of logical portions of computer system 100 in FIG. 1 in accordance with the preferred embodiments.

A logical view of some of the components in computer system 100 in FIG. 1 is shown in FIG. 5 in a formal similar to the prior art computer system 200 shown in FIG. 3. Note that computer system 100 includes an additional hosting partition 125B that is a backup partition that allows the I/O adapters 260A, . . . , 260S to be migrated from the current hosting partition 125A to the new hosting partition 125B in a manner that minimally impacts system performance. Partition manager 121 preferably includes a hosting partition update mechanism 122 that updates the I/O capability of the logically-partitioned computer system 100 by first updating the hosting partition 125B to include all desired updates, then migrating all I/O adapters 260 owned by the hosting partition 125A to the new hosting partition 125B. This approach allows the current hosting partition 125A to continue to service I/O requests while the new hosting partition 125B is updated to the new, desired configuration. Once all I/O adapters 260 have been migrated to the hosting partition 125B, the hosting partition 125A may be retained as a backup hosting partition, or may be eliminated.

Figure 6:
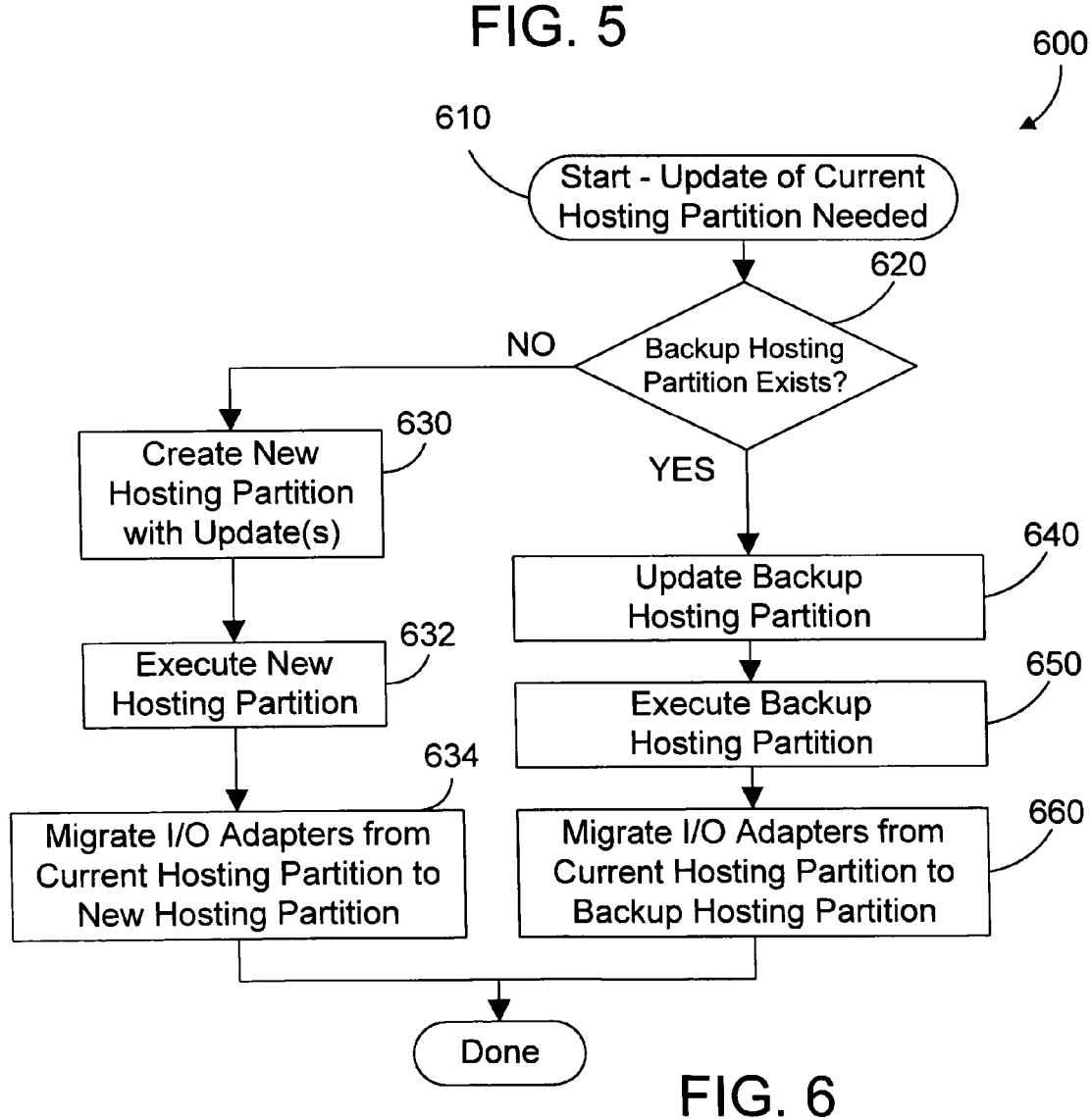
FIG. 6 is a flow diagram of a method in accordance with the preferred embodiments for updating a hosting partition.

Referring to FIG. 6, a method 600 in accordance with the preferred embodiments begins when an update of the current hosting partition is needed (step 610). In the preferred embodiments, the determination of when an update is needed is made depending on which operational mode is selected, which is discussed in more detail below. If a backup hosting partition does not exist (step 620=NO), a new hosting partition with the desired updates is created (step 630). The new hosting partition is then executed (or run) (step 632). The I/O adapters are then migrated from the current hosting partition to the new hosting partition (step 634). Note that this migration of I/O adapters in step 634 may be done in bulk, in smaller groups, or one at a time. If a backup hosting partition already exists (step 620=YES), a new hosting partition need not be created. The update is installed on the backup hosting partition (step 640). If the update requires rebooting, the backup hosting partition is rebooted in step 640. The backup hosting partition is then executed (step 650). Once the backup hosting partition is up and running with the desired updates, the I/O adapters controlled by the current hosting partition are migrated to the backup hosting partition (step 660). As is the case in step 634, this migration of I/O adapters in step 660 may be done in bulk, in smaller groups, or one at a time.

Figure 7:
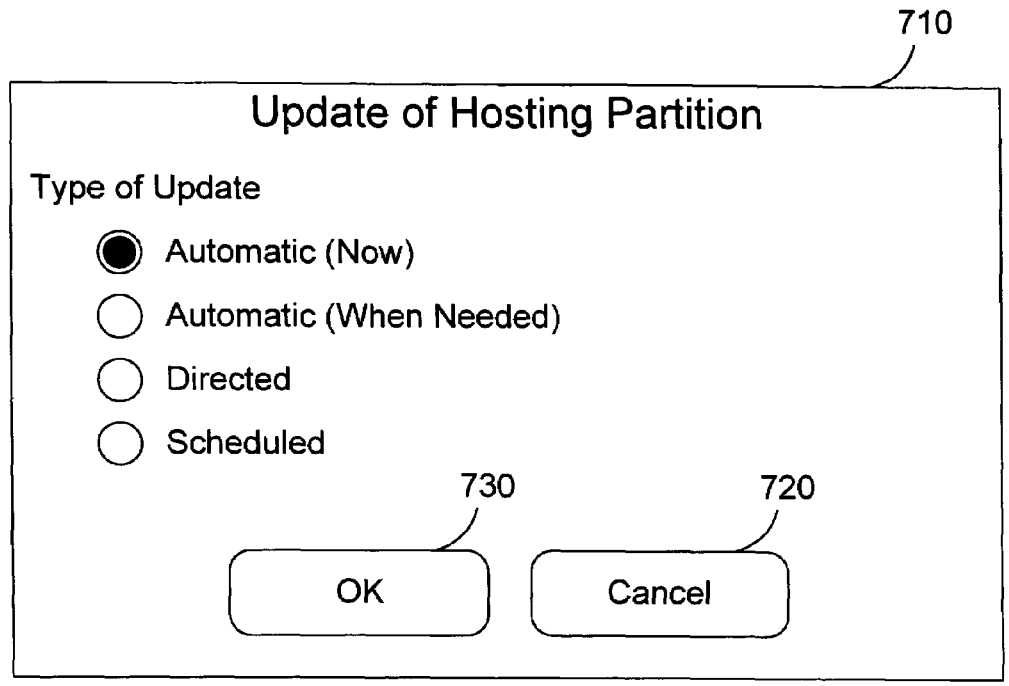
FIG. 7 is a sample user interface display window showing different types of updates to a hosting partition within the scope of the preferred embodiments.

The partition management tool 123 in FIG. 1 provides a user interface that allows a user (e.g., system administrator) to determine how the update of the current hosting partition will be performed. One sample display window 710 provided by the partition management tool 123 is shown in FIG. 7. We assume that the user may select for updating the current hosting partition using any of four different operational modes. The first mode is an automatic update now (which is selected via the radio button in FIG. 7). The second mode is automatic update when needed, i.e., when specified criteria are met. The third mode is a directed mode, which requires interaction with the user. The fourth mode is scheduled, which allows the user to schedule a time in the future for automatically updating the hosting partition. In this simple example, we assume the user selects one of the four modes listed in the display window 710 in FIG. 7 by clicking on the desired radio button, then clicking on the OK button 730. Of course, the user may cancel by clicking on the Cancel button 720.

Automatic update now of the hosting partition (which is selected in display window 710 in FIG. 7) is performed automatically without further user input or intervention once the user clicks the OK button 730. The hosting partition update mechanism 122 thus preferably performs method 600 in FIG. 6 without further input from the user.

Figure 8:
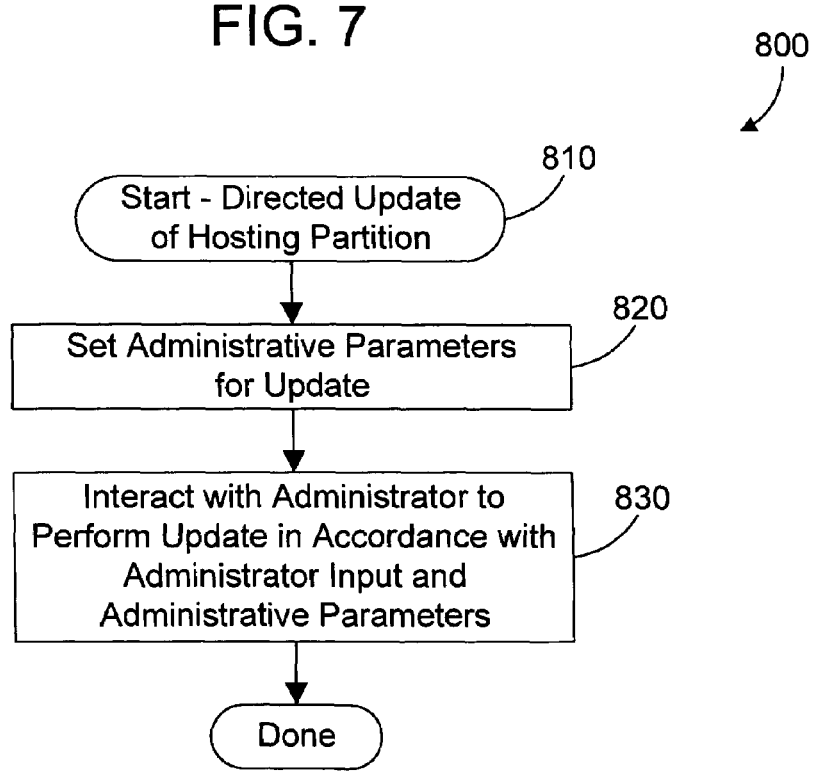
FIG. 8 is a method in accordance with the preferred embodiments for performing a directed update of the hosting partition.

One way for the hosting partition update mechanism 122 to perform a directed update of the hosting partition is shown as method 800 in FIG. 8. Method 800 begins when a directed update has been selected (e.g., by the user clicking the "Directed" radio button in display window 710 and clicking the OK button 730). A directed update means the user is actively involved in performing the update. The user sets administrative parameters for the update (step 820). The update is then performed by interacting with the administrator to perform the update in accordance with the administrator input and the administrative parameters the administrator previously set (step 830).

Figure 9:
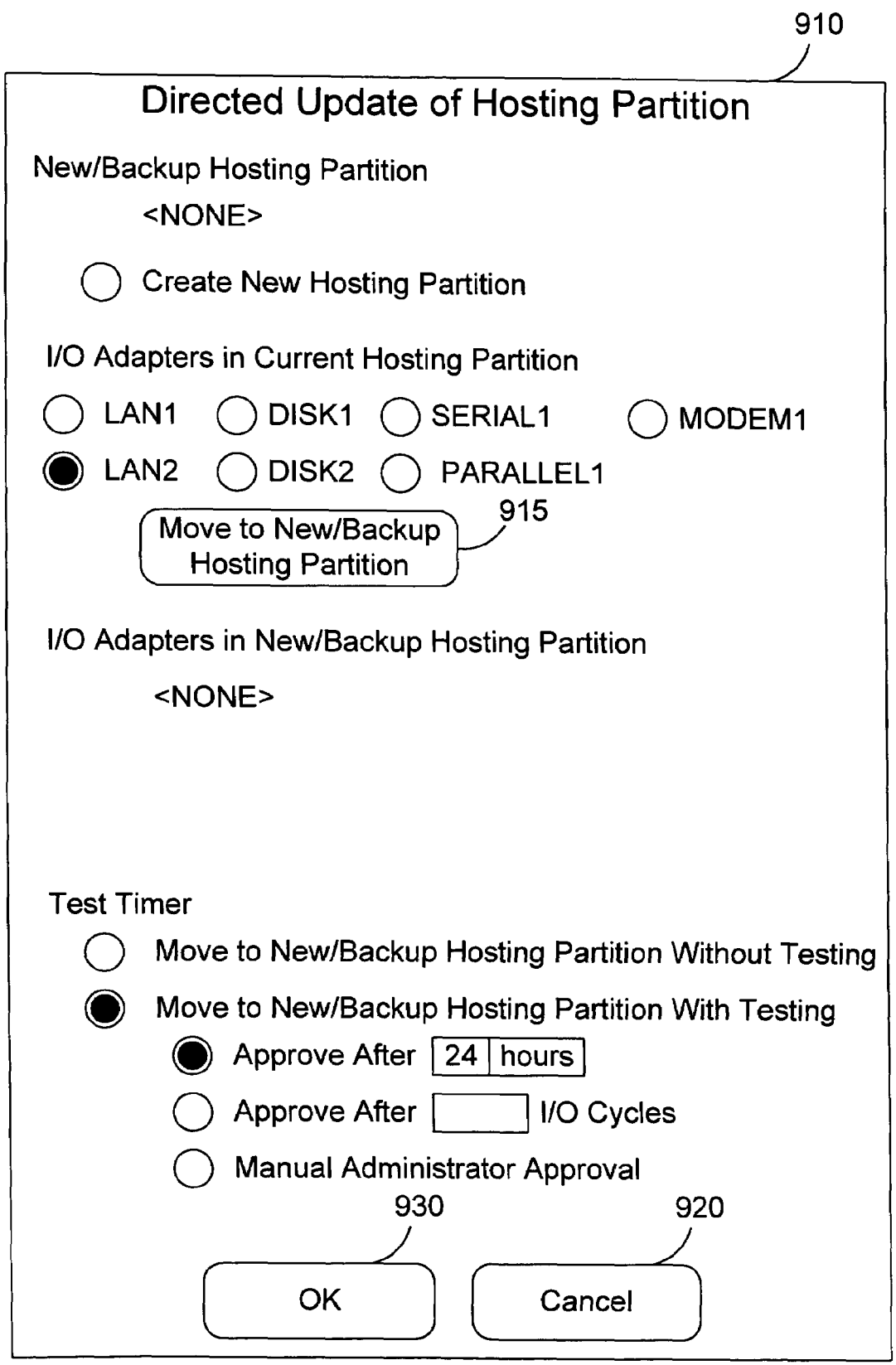
FIG. 9 is a sample user interface display window showing some options that a system administrator could select when performing a directed update of the hosting partition.

One sample display window 910 that could be displayed to a user (system administrator) during method 800 is shown in FIG. 9. Display window 910 includes a listing of a new or backup partition (if one exists), a listing of I/O adapters in the current hosting partition, a listing of I/O adapters in the new or backup hosting partition, and a menu that allows the user to select whether to perform testing before accepting an I/O adapter that has been migrated. The display window 910 as shown in FIG. 9 would be the screen the user would be shown after selecting a directed update of the hosting partition in display window 710 of FIG. 7. This display shows that no new or backup hosting partition exists. The user could first select the radio button corresponding to "Create New Hosting Partition" and click OK 930, which would cause the new hosting partition to be created and listed under the New/Backup Hosting Partition at the top of display window 910. Once the new hosting partition exists, the I/O adapters may be migrated from the current hosting partition to the new hosting partition. Note that multiple I/O adapters may preferably be selected at the same time. In the example shown in FIG. 9, the user has selected the LAN2 I/O adapter in the current hosting partition. The user could then click on the "Move to New/Backup Hosting Partition" button 915, which would cause the LAN2 I/O adapter to be migrated from the current hosting partition to the new hosting partition. Once migrated, the LAN2 I/O adapter would be displayed under the heading "I/O Adapters in New/Backup Hosting Partition", and would no longer be listed under "I/O Adapters in Current Hosting Partition." The user may continue to select and manually move any single I/O adapter or any group of I/O adapters, including all I/O adapters. In addition, the user may set a test timer to allow a period of time for testing the new configuration. In FIG. 9, the radio button corresponding to "Move to New/Backup Hosting Partition With Testing" is selected, and the radio button for "Approve After" is selected, with the value 24 hours selected or typed in. This means that each I/O adapter will be tested for 24 hours before the migration from the current hosting partition to the new hosting partition is approved. If there is a failure during the 24 hour period that causes the testing to fail, the user will be notified with an error message. The user may then select to migrate the I/O adapter back to the current hosting partition from the new hosting partition. Note that the user may also select approval after a specified number of I/O cycles, or may require manual administrator approval. Furthermore, the administrator may select to move the I/O adapters to the hosting partition without testing. This may be useful if an update has already been tested on a similar platform and configuration, thereby allowing the migration to occur without further testing.

Figure 10:
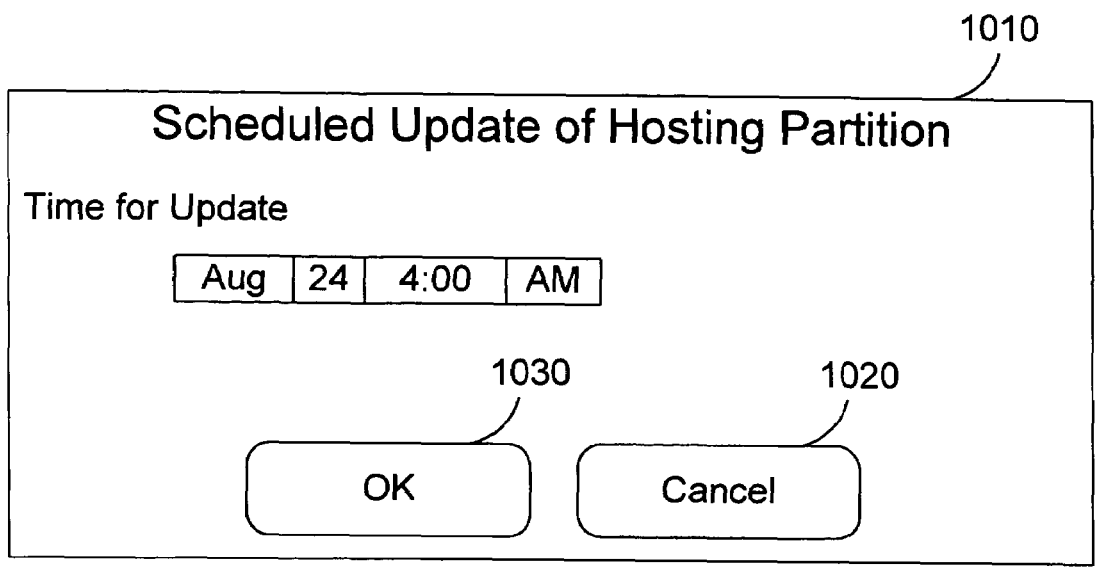
FIG. 10 is a sample user interface window showing the scheduling of a time for a scheduled update in accordance with the preferred embodiments.

Referring to FIG. 10, a display window 1010 is displayed to a user when the user selects the "scheduled" radio button in display window 710 of FIG. 7. The user may select or type in a scheduled time for the update. In display window 1010 in FIG. 10, the user has selected the update to occur on August 24 at 4:00 AM. Once this time arrives, the scheduled update is executed the same as an automatic update now, without further user intervention. Of course, the user could also schedule a directed update in the future as well.

Figure 11:
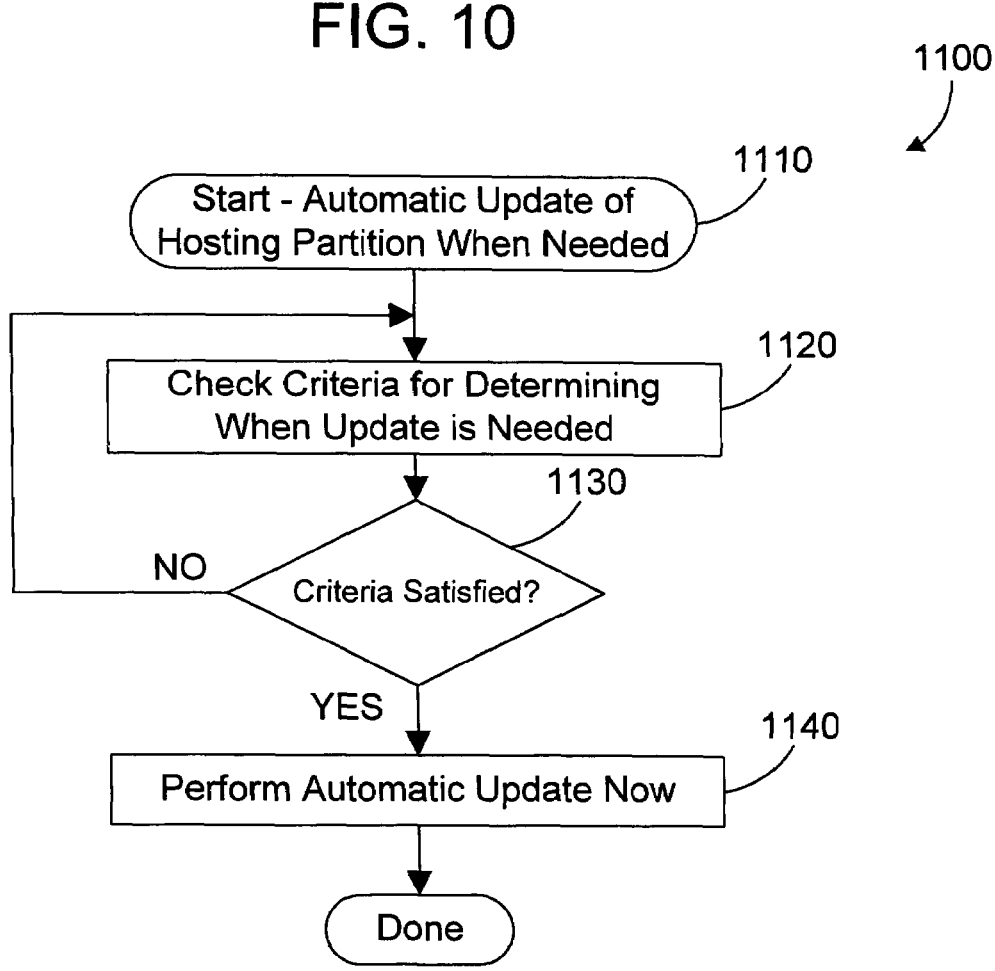
FIG. 11 is a flow diagram of a method in accordance with the preferred embodiments for performing an automatic update of the hosting partition when needed.

Referring to FIG. 11, a method 1100 begins when the user selects an automatic update of the current hosting partition when needed (step 1110) (e.g., by clicking on the radio button that corresponds to "Automatic (When Needed)" in display window 710 of FIG. 7, followed by clicking on the OK button 730). We assume the user selects some criteria for performing the update. For example, a new software release from a vendor could trigger an automatic update when needed. In this scenario, the computer system could check the web sites for updates to all software running in the system. The criteria for performing an update could be an installable update from a software vendor for software running on the current hosting partition. The criteria are checked to determine when an update is needed (step 1120). If the criteria are not satisfied (step 1130=NO), method 1100 loops back to step 1120 and continues until the criteria are satisfied (step 1130=YES). This looping in steps 1120 and 1130 may be replaced by a periodic check to find out if the criteria is satisfied, rather than a continuous check in a tight loop. For example, software updates may only occur a few times a year, so a quick check to the vendor's web site could easily determine whether the criteria is satisfied or not without continuously polling or interrogating the web site for update information. Once the criteria are satisfied (step 1130=YES), an automatic update now is performed (step 1140), which means the update may be performed without further input by the user. Of course, the automatic update when needed could be modified within the scope of the preferred embodiments to notify the user when the criteria is met, thereby allowing the user to perform a directed update instead of an automatic update.

Figure 12:
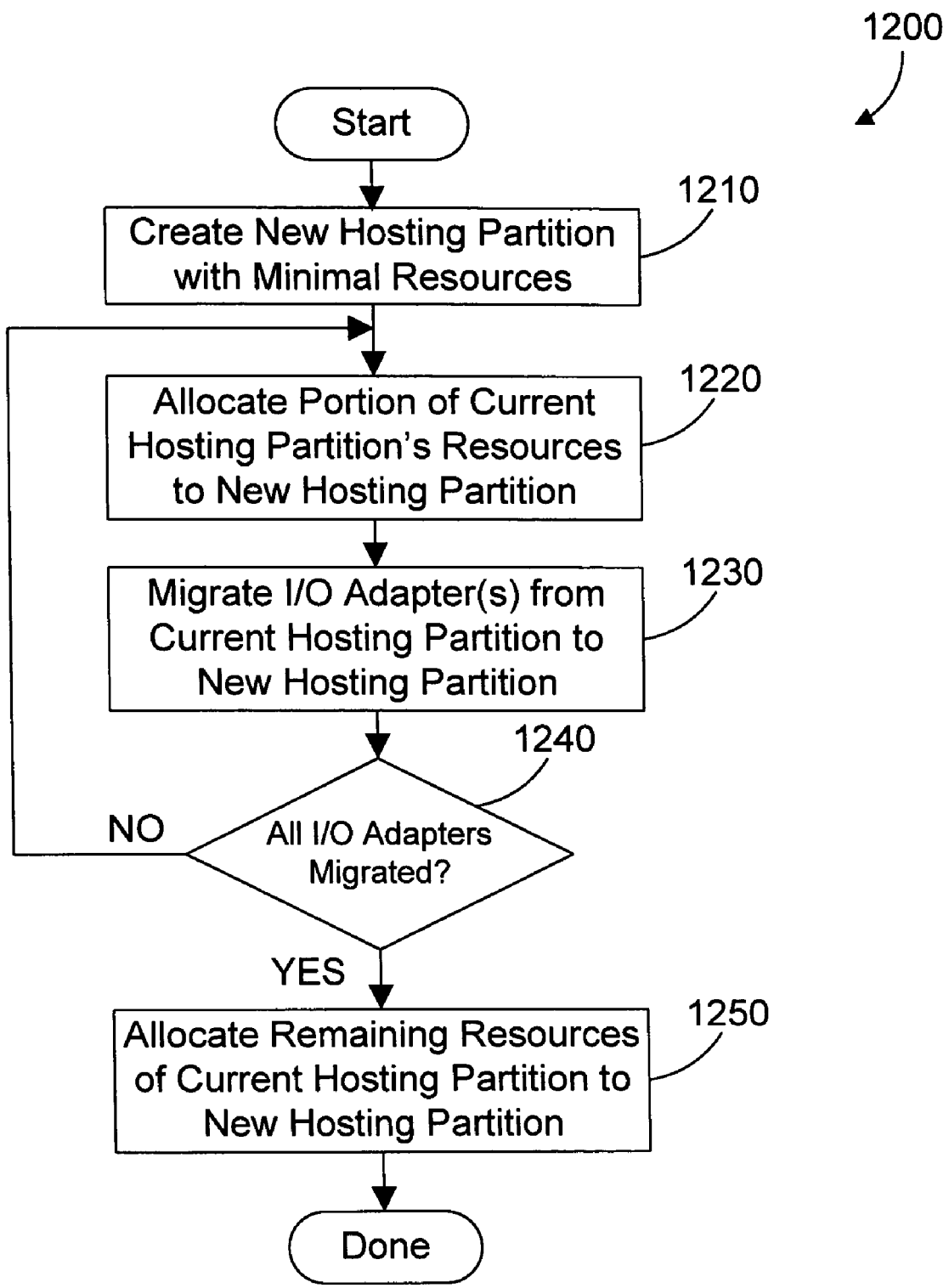
FIG. 12 is a method in accordance with the preferred embodiments for incrementally migrating resources from the current hosting partition to the new or backup hosting partition to support the migration of I/O adapters.

Referring to FIG. 12, a method 1200 in accordance with the preferred embodiments allows the migration of I/O adapters from the current hosting partition to a new hosting partition with only minimal resources allocated to the new hosting partition. The new hosting partition is created with a minimal allocation of memory and processor resources (step 1210). A portion of the current hosting partition's resources are then allocated to the new hosting partition (step 1220). One or more I/O adapters may then be migrated from the current hosting partition to the new hosting partition (step 1230). If there remain any I/O adapters in the current hosting partition that need to be migrated (step 1240=NO), method 1200 loops back to step 1220 and continues. Once all I/O adapters have been migrated from the current hosting partition to the new hosting partition (step 1240=YES), all remaining resources in the current hosting partition that may be allocated are allocated to the new hosting partition (step 1250). In this manner the memory and processor resources of the current hosting partition are incrementally allocated to the new hosting partition piece-by-piece as the I/O adapters are migrated between the two. Note that this same method 1200 could be performed when using a backup hosting partition instead of a new hosting partition.

In a simple implementation of method 1200, we assume a current hosting partition is allocated 50% of a processor and 30% of the memory. We further assume that the current hosting partition is an I/O partition that controls ten shared I/O adapters. The new hosting partition is created with a minimal allocation of processor and memory resources. To move the first I/O adapter, ten percent of the processor and memory owned by the current hosting partition may be allocated to the new hosting partition. Thus, 10% of the 50% of a processor (or 5%), and 10% of the 30% of the memory (or 3%) may be allocated from the current hosting partition to the new hosting partition in preparation for migrating the first I/O adapter. Once this allocation is made, the current hosting partition will have 45% of a processor and 27% of the memory, while the new hosting partition will have 5% of a processor and 3% of the memory (which may be in addition to the minimal resources initially allocated to the new hosting partition when it was created). This process of incrementally shifting resources from the current hosting partition to the new hosting partition continues as the I/O adapters are migrated between the two, until all of the adapters have been migrated. At that point any remaining resources in the current hosting partition are allocated to the new hosting partition in step 1250. Note that the current hosting partition may be required to retain a minimal amount of resources if it is kept as a backup hosting partition. Of course, if the current hosting partition is eliminated, even the minimal resources required to maintain it may then be allocated to the new hosting partition. At this point the new hosting partition has all the resources that were previously owned by the current hosting partition, and the current hosting partition has no resources or only minimal resources.

Once the migration from current hosting partition to new hosting partition is complete using any of the four modes of operation shown in display window 710 of FIG. 7, the current hosting partition may be eliminated, or may be retained as a backup hosting partition for future use. One possible future use is to provide a backup hosting partition that may be updated in the future. Another possible future use is to provide a backup hosting partition with the old software configuration that allows any or all I/O adapters to be "rolled back" by migrating them back to the backup hosting partition.

Another aspect of the preferred embodiments is the ability to use temporary capacity on demand, if available, in performing the updating process. Temporary capacity on demand is known in the art, and allows a user to pay for additional resources (such as processors) as they are needed. In a logically-partitioned computer system that hosts one or more very busy logical partitions, the update may be made more quickly (although at additional cost) by using temporary capacity on demand to perform the update.

The preferred embodiments provide a way to update the I/O capacity of a logically-partitioned computer system without rebooting a logical partition. A new hosting partition is created, is updated with the desired updates, and the I/O adapters owned by the current hosting partition are then migrated to the new hosting partition. The movement of an I/O adapter between logical partitions may be done very quickly with a minimal impact on system performance and availability of I/O. Because logical partitions may be individually rebooted, the installation of an update that requires rebooting of a logical partition may be performed on the new hosting partition while the I/O adapters are still controlled by the current hosting partition, thus eliminating the long downtime of I/O that results when a hosting partition is rebooted in the prior art. As a result, the I/O capability of a logical partition may be updated with a minimal impact on logical partitions that depend on that I/O capability.

In a variation within the scope of the preferred embodiments, a current hosting partition could signal to the hosted partitions to pause their I/O requests and drain their I/O queues. The hosted partitions could then confirm with a message to the hosting partition that they are paused. Once paused, the migration of I/O adapters may take place from the current hosting partition to the new or backup hosting partition. Once all I/O adapters have been migrated to the new or backup hosting partition, the new or backup hosting partition may then signal to the hosted partitions to resume their I/O activity.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A method for updating I/O capability of a logically-partitioned computer apparatus that includes a first logical partition that executes a first operating system and controls a plurality of shared I/O adapters that are shared by a second logical partition that executes a second operating system on the computer apparatus, the method comprising the steps of:
   (A) updating a third logical partition on the computer apparatus;
   (B) migrating less than all of the plurality of shared I/O adapters from the first logical partition to the third logical partition; and
   (C) testing the migrated shared I/O adapters before migrating other of the plurality of shared I/O adapters to the third logical partition.

2. The method of claim 1 further comprising the step of creating the third logical partition.

3. The method of claim 1 wherein step (B) is performed automatically without further input by a user.

4. The method of claim 1 wherein step (B) is performed automatically when at least one criterion is satisfied.

5. The method of claim 1 wherein step (B) is performed interactively with a user according to input from the user.

6. The method of claim 1 wherein step (B) is performed automatically at a specified time.

7. The method of claim 1 further comprising the step of allocating a portion of resources owned by the first logical partition to the third logical partition.

8. The method of claim 1 further comprising the steps of:
   (D) allocating a portion of the resources owned by the first logical partition to the third logical partition;
   (E) migrating at least one I/O adapter controlled by the first logical partition to the third logical partition;
   (F) repeating steps (D) and (E) until all I/O adapters controlled by the first logical partition have been migrated to the third logical partition; and
   (G) allocating remaining resources owned by the first logical partition to the third logical partition.

9. The method of claim 1 wherein the third logical partition comprises an I/O partition.

10. The method of claim 1 further comprising the step of:
    (D) after performing steps (A) and (B), keeping the first logical partition as a backup partition for the third logical partition.

11. A method for updating I/O capability of a logically-partitioned computer apparatus that includes a first logical partition that executes a first operating system and that controls a plurality of shared I/O adapters that are shared by a second logical partition that executes a second operating system on the computer apparatus, the method comprising the steps of:
    (A) allocating a portion of resources owned by the first logical partition to the third logical partition;
    (B) migrating at least one shared I/O adapter controlled by the first logical partition to the third logical partition;
    (C) repeating steps (A) and (B) until all shared I/O adapters controlled by the first logical partition have been migrated to the third logical partition; and
    (D) allocating remaining resources owned by the first logical partition to the third logical partition.

12. A method for updating I/O capability of a logically-partitioned computer apparatus that includes a first logical partition that executes a first operating system and controls a plurality of shared I/O adapters that are shared by a second logical partition that executes a second operating system on the computer apparatus, the method comprising the steps of:
    (A) creating a third logical partition on the computer apparatus that executes a third operating system;
    (B) updating the third logical partition;
    (C) migrating the plurality of shared I/O adapters from the first logical partition to the third logical partition;
    (D) wherein step (C) may be performed using any of the following operational modes:
        (D1) wherein steps (B) and (C) are performed automatically without further input by a user;
        (D2) wherein steps (B) and (C) are performed automatically when at least one criterion is satisfied;
        (D3) wherein steps (B) and (C) are performed interactively with a user according to input from the user; and
        (D4) wherein steps (B) and (C) are performed automatically at a specified time;
    (E) allocating a portion of resources owned by the first logical partition to the third logical partition;
    (F) migrating at least one shared I/O adapter controlled by the first logical partition to the third logical partition;
    (G) repeating steps (B and (F) until all shared I/O adapters controlled by the first logical partition have been migrated to the third logical partition; and
    (H) allocating remaining resources owned by the first logical partition to the third logical partition.

13. The method of claim 12 further comprising the step of keeping the first logical partition as a backup partition for the third logical partition.

* * * * *